Oct. 1, 1935.   W. C. HANSEN ET AL   2,016,142
WINDSHIELD WIPER CONTROL MECHANISM
Filed Nov. 17, 1933
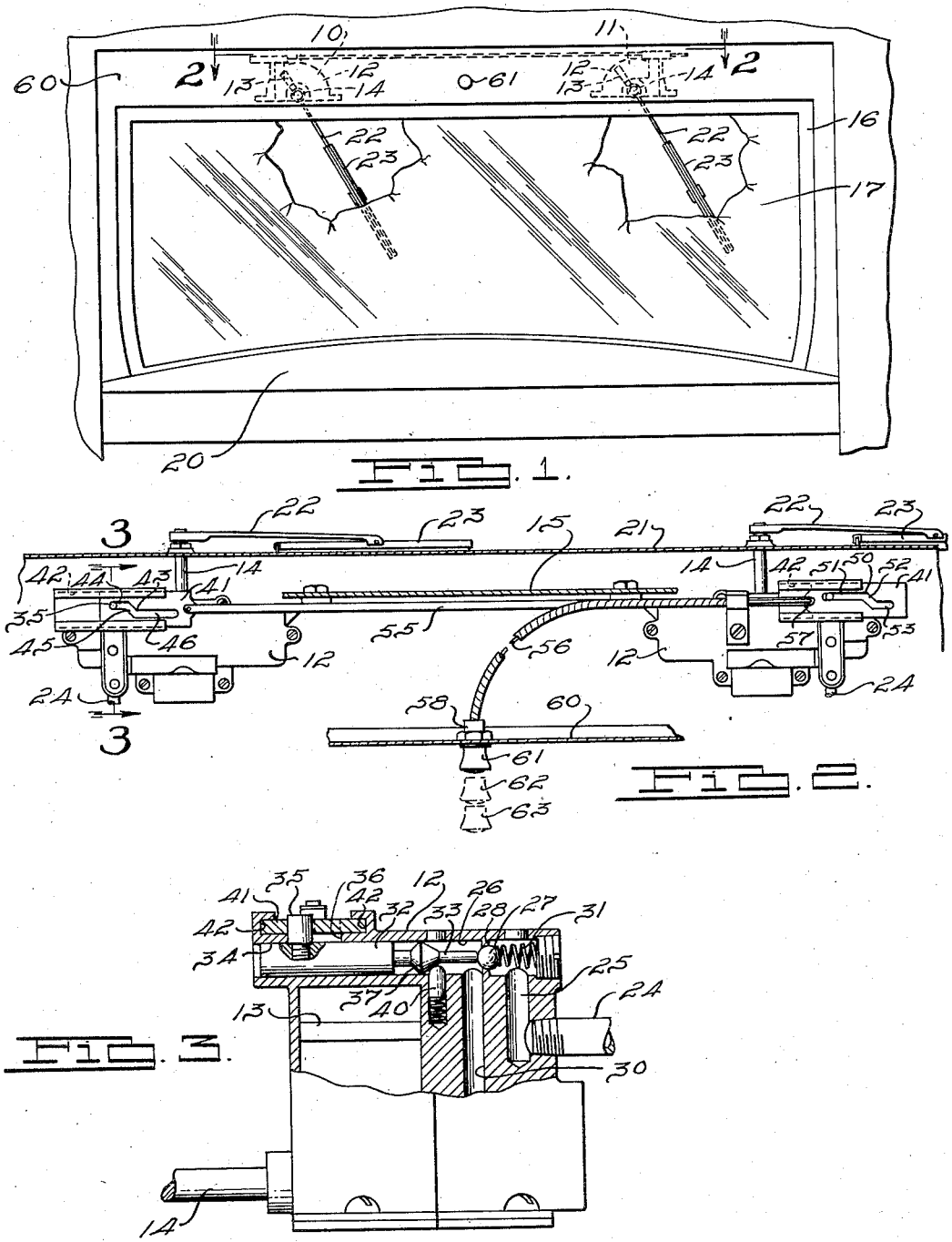
INVENTORS
WRAY C. HANSEN AND
EDMOND F. WEBB.
BY
ATTORNEY Patented Oct. 1, 1935

2,016,142

UNITED STATES PATENT OFFICE 2,016,142

WINDSHIELD WIPER CONTROL MECHANISM

Wray C. Hansen, Detroit, and Edmond F. Webb, Highland Park, Mich., assignors to Chrysler Corporation, Detroit, Mich., a corporation of Delaware Application November 17, 1933, Serial No. 698,484

6 Claims. (Cl. 15—255)

This invention relates to power operated windshield wiper mechanism and more especially to control mechanism for that type of windshield wiper which employs a plurality of wiping elements.

Among the objects of the present invention are to provide: control mechanism for a windshield wiper having a plurality of wiper blades, which control mechanism selectively controls the operation of one or more than one of the wiper blades; control means having a single control element which adjusted to one position causes operation of said one windshield wiper blade and in another position causes simultaneous operation of a plurality of windshield wiper blades; control mechanism particularly adapted for actuating reciprocating of slide valve of windshield wiper mechanism; and control mechanism which comprises two parts, is efficient in operation, and may be readily assembled in the body of a motor vehicle.

Other objects and advantages will become apparent from the following description and appended claims.

For the purpose of illustrating the genus of the invention, a typical concrete embodiment is illustrated in the accompanying drawing, in which:

Figure 1 is an elevation of a portion of the front of an automotive vehicle, as viewed from the interior of the body thereof, having a windshield wiper mechanism according to this invention associated therewith;

Fig. 2 is a section, on an enlarged scale, taken on the line 2—2 of Fig. 1; and

Fig. 3 is a section, on a still more enlarged scale, taken on the line 3—3 of Fig. 2.

Referring to the drawing, 10 and 11 designate two fluid pressure or suction operated motors, each consisting of a substantially semi-cylindrical casing 12 containing a piston or vane 13, which is fixed to a wiper operating shaft 14 journaled in the casing. These two motors are shown as being mounted on a header panel 15 on other suitable support at the top of the windshield frame 16 of a transparent windshield 17. Optionally these motors may be mounted on the instrument panel 20 or other suitable support at the base of the windshield frame so as to operate in inverted position upon the windshield 17. The wiper shafts 14 project forwardly from the casings 12 and through an outer panel 21 of the automobile body. Wiper arms 22 are fixed to the forward ends of the wiper shafts 14 and upon the free ends of the wiper arms are pivotally mounted wiper blades 23. Referring to Fig. 2 of the drawing, an intake conduit 24 leads into each of the casings 12 from a suitable source of power, not shown, such as the intake manifold of an internal combustion engine.

Referring more especially to Fig. 3 of the drawing, the conduit 24 leads into an intake passage 25 which in turn communicates with a horizontal passage 26 closed at an intermediate point by valve 27 cooperating with a valve seat 28. A passage 30 communicates between the passage 26 at a point on the opposite side of the valve seat 28 from the intake passage 25 and reversing mechanism for alternately applying pressure or suction to opposite sides of the vane 13 for causing oscillation of the windshield wiper blade 23 back and forth across the windshield 17 to clean the same.

The reversing mechanism for alternately applying fluid pressure or suction to the opposite side of the vane 13 forms no part of the present invention and need not be described in detail. The valve 27 serves to control the application of fluid pressure or suction to the operating means for the windshield wiper mechanism.

The intake control valve 27 is normally biased into closed position against the valve seat 28 by means of a spring 31. The valve 27 may be opened by a plunger 32 provided with an axially disposed pin or rod 33 engageable with the valve 27. The plunger 32 is adapted to reciprocate within a suitable cylinder 34 and is also provided with an upwardly projecting pin 35. The pin 35 is disposed in a slot 36 extending longitudinally of the cylinder 34 and plunger 32. The pin or rod 33 is provided with a cam 37 adapted to cooperate with a spring pressed detent 40 mounted in the housing 12 and arranged to keep the pin 33 out of engagement with the valve 27 or to maintain this valve in open position.

Referring to Figs. 2 and 3, the plunger 32 is adapted to be actuated by a slide plate 41 mounted in a slideway 42 provided on the upper surface of the casing 12. The slide plate 41 for the left hand windshield wiping mechanism shown in Fig. 2 is provided with a cam slot 43 which has a short longitudinally extending portion 44 and an inclined portion 45 in the left hand half of the plate communicating with a longer longitudinally extending portion 46 arranged in the lower half of the plane and extending from the approximate left center portion of the slideway to a point near the right hand end of the slide plate.

The slide 41 for the right hand windshield wiper, as shown in Fig. 2, is provided with a cam slot 50 which comprises a longitudinally extending portion 51 of approximately the same length as portion 46 and arranged in the same plane as the longitudinally extending portion 44 of the cam slot 43 and extending from a point near the left hand end of the plate to a point in the approximate right center portion of the plate. The portion 51 of slot 50 communicates with an inclined portion 52 which in turn communicates with a short longitudinally extending portion 53 of about the length of portion 44 and arranged in the lower half of the plate and in the same vertical plane as the longitudinally extending portion 46 of the slot 43 in the slide plate for the left hand wiper mechanism. Slide plates 41 of the two windshield wipers shown in Fig. 2 are interconnected by means of a bar 55 or other rigid member so that the slide plates will have equal movement. The two slide plates and bar 55 may be moved in a plane parallel to that of the windshield 17 by any suitable means, but preferably this means comprises a Bowden wire 56 attached to one of the slide plates or to the bar 55 as indicated at 57. The Bowden wire 56 extends through a bearing member 58 mounted in an interior header panel 60 and the terminal of the Bowden wire is provided with a manual knob or handle 61 which is adapted to be moved to the full line position or to the positions 62 and 63, indicated in dotted lines in Fig. 2.

In the operation of the above construction, the manual operating handle may be moved to the shut position as indicated in full line in Fig. 2 in which instance both slide plates 41 are moved to the right so that the pins 35 are disposed in the longitudinal positions 51 and 44 of slots 43 and 50 causing the plungers 32 to assume the left hand position indicated in Fig. 3 and allowing the springs 31 to maintain the control valves 27 of both windshield wipers in closed position. With the parts in this position both windshield wipers are inactive. If the manual control handle 61 is withdrawn from the panel 60 to the position indicated at 62, both plates 41 and the connecting rod 55 are moved to the left so that in the left hand windshield wiper the pin 35 moves along the portion 44 and the inclined portion 45 into the portion 46 of slot 43. This causes the pin 35 of the left hand windshield wiper to move rearwardly from the position indicated in Fig. 2 and to the right from the position indicated in Fig. 3 moving the plunger 32 toward the valve 27 so that the pin 33 lifts the valve 27 from the seat 28 opening the passage 26 for pressure or suction from the source thereof to the reversing mechanism for applying pressure or suction to opposite sides of the vane 13 causing operation of the left hand windshield wiper. Movement of the operating handle 61 to the position indicated at 62 does not cause the pin 35 of the right hand windshield wiper to leave the longitudinally extending portion 51 of the cam slot 50 so that this windshield wiper is not brought into operation at this time.

Further withdrawal of the operating handle 61 relative to the interior panel 60 to the position indicated in 63 causes further movement to the left of the slide plates 41, the pin 35 of the left hand windshield wiper remaining in the longitudinally extending position 46 of slot 43 while the pin 35 of the right hand windshield wiper has been caused to pass through the inclined portion 52 of slot 50 and into the longitudinal extending portion 53 of this cam slot. This causes movement of the pin 35 of the right hand windshield wiper rearwardly from the position indicated in Fig. 2 and to the right from the position indicated in Fig. 3 moving the plunger 32 of the right hand windshield wiper toward the control valve 37, causing the pin 33 to unseat this valve and initiate operation of the right hand windshield wiper. Since the pin 35 of the left hand windshield wiper remains in the longitudinal portion 46 of the cam slot 43, the left hand windshield wiper remains in operation during movement of the operating handle 61 from the position 62 to the position indicated at 63.

Thus with the operating handle 61 in the position indicated at 63 simultaneous operation of both windshield wipers is effected. Movement of the operating handle 61 from the position indicated at 63 to the position indicated at 62 moving both slide plates 41 to the right causing the pin 35 to leave the slot portions 53 and 52 of the cam slot 50 of the right hand slide plate 41 stopping operation of the right hand windshield wiper. As the operating handle 61 is moved from the position indicated at 63 to the position indicated at 62, the pin 35 of the left hand windshield wiper remains in the longitudinal portion 46 of cam slot 43 so that the left hand windshield wiper remains in operation. Movement of the operating handle 61 from the position indicated at 62 to the full line position shown in Fig. 2 causes the pin 35 of the right hand windshield wiper to remain in the longitudinally extending portion 51 of the right hand slide plate 41 so that the right hand windshield wiper remains shut off while the pin 35 of the left hand windshield wiper is moved through the inclined portion 45 and the longitudinally extending portion 44 of the cam slot 43 of the left hand slide plate shutting off operation of the left hand windshield wiper.

Thus, with the operating handle 61 in the full line position shown in Fig. 2 neither windshield wiper operates, while with the operating handle 61 in the position indicated at 62 the left hand windshield wiper only operates, and with the operating handle 61 in the position indicated at 63 both windshield wipers operate simultaneously. This is the arrangement which would be employed in left hand drive vehicles. For a right hand drive vehicle the plates 41 could be interchanged so that with the operating handle 61 in the position indicated at 62 only the right hand windshield wiper would operate.

As many changes could be made in the above construction and many apparently widely different embodiments of this invention could be effected without departing from the spirit thereof, it is intended that all matter contained in the above description or shown in the accompanying drawing shall be interpreted as illustrative and not in a limiting sense.

What is claimed is:

1. In a windshield cleaner, a plurality of wiper blades, individual actuating devices, one associated with each of said blades respectively for operating the same and each having an individual control member, and control mechanism connected with and common to said control members, said mechanism being so constructed and arranged as to selectively place one or a plurality of said individual actuating devices in operation.

2. In a windshield cleaner, a plurality of wiper blades, individual fluid pressure devices associated with each of said blades for operating the same and each having an individual control member, and control mechanism connected with and common to said control members having elements constructed and arranged to operate the latter in a predetermined time relationship for selectively placing one or a plurality of said individual fluid pressure devices in operation.

3. In a windshield cleaner, a plurality of wiper blades, means individual to each of said blades for operating the same, reciprocable elements each individual to one of said individual operating means, said elements being reciprocable in the same direction for causing operation of the operating means associated therewith, and cam means including a shiftable member articulated with said reciprocable elements for reciprocating the latter in a predetermined time relation so as to selectively cause operation of one individual operating means and simultaneous operation of a plurality of said operating means.

4. In a windshield cleaner, a plurality of wiper blades, a plurality of fluid pressure means, one individual to each blade for operating the same, a plurality of reciprocable valves, one operatively associated with each fluid pressure means respectively for controlling the same, and a reciprocable control member having a plurality of control elements each provided with a cam surface engageable with one of said reciprocable valves respectively for causing operation of one fluid pressure means and for causing simultaneous operation of a plurality of said fluid pressure means.

5. In combination with a windshield, a pair of wiper blades pivotally mounted a fixed distance apart for cleaning said windshield, means individual to each blade for operating the same, a control element for each individual operating means, a pair of reciprocable members each having a cam surface engageable with one of said elements for actuating the same, rigid means connecting said reciprocable members for maintaining them a fixed distance apart, said cam surfaces being arranged to successively move said control elements upon reciprocation of said members, whereby reciprocation of said members first causes one cam surface to move one control element to cause operation of one windshield wiper blade and further reciprocation of said members in the same direction causes the other cam surface to move the other of said elements to cause simultaneous operation of both wiper blades.

6. In a windshield cleaner, a plurality of wiper blades, individual actuating devices one associated with each of said blades respectively for operating the same and each having an individual control valve, individual reciprocable elements for operating each of said control valves, and a control member connected with and common to said reciprocable elements, said control member being so constructed and arranged as to reciprocate said elements for selectively operating one or a plurality of said control valves.

WRAY C. HANSEN.
EDMOND F. WEBB.